United States Patent
Carlough et al.

(10) Patent No.: US 8,554,822 B2
(45) Date of Patent: Oct. 8, 2013

(54) DECIMAL ADDER WITH END AROUND CARRY

(75) Inventors: Steven R. Carlough, Wappingers Falls, NY (US); Adam B. Collura, Hyde Park, NY (US); Klaus M. Kroener, Ehningen (DE); Silvia M. Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 12/822,919

(22) Filed: Jun. 24, 2010

(65) Prior Publication Data

US 2011/0320514 A1     Dec. 29, 2011

(51) Int. Cl.
*G06F 7/494*     (2006.01)

(52) U.S. Cl.
USPC ........................................ 708/685

(58) Field of Classification Search
None
See application file for complete search history.

(56) References Cited

U.S. PATENT DOCUMENTS

| | | | | |
|---|---|---|---|---|
| 4,094,138 A | * | 6/1978 | Chetelat et al. | 368/111 |
| 4,866,656 A | * | 9/1989 | Hwang | 708/670 |
| 7,054,898 B1 | | 5/2006 | Tzeng et al. | |
| 2003/0055859 A1 | | 3/2003 | Seidel et al. | |
| 2011/0320514 A1 | * | 12/2011 | Carlough et al. | 708/505 |

OTHER PUBLICATIONS

Liang-Kai Wang et al., A Decimal Floating-Point Adder With Decoded Operands and a Decimal Leading-Zero Anticipator, IEEE International Symposium on Computer Arithmetic, 2009, pp. 125-134.

Liang-Kai Wang et al., Decimal Floating-Point Adder and Multifunction Unit with Injection-Based Rounding, IEEE International Symposium on Computer Arithmetic, 2007, pp. 56-68.

* cited by examiner

*Primary Examiner* — David H Malzahn
(74) *Attorney, Agent, or Firm* — Cantor Colburn LLP; John Campbell

(57) ABSTRACT

Binary code decimal (BCD) arithmetic add/subtract operations on two BCD numbers independent of which BCD number is of a greater magnitude include, responsive to the BCD arithmetic add/subtract operation being a subtract operation, performing a BCD arithmetic subtraction operation on a first BCD number and a second BCD number, the first BCD number having a first magnitude and the second BCD number having a second magnitude. The first magnitude is greater than, equal to, or less than the second magnitude. The performing includes: in parallel to a carry generation, partial sums or partial differences of the first and second BCD numbers are computer such that a final result in signed magnitude form is selectable from the partial sums or differences based on carry information without any post processing steps.

18 Claims, 5 Drawing Sheets

DECIMAL ADDER WITH END AROUND CARRY

BACKGROUND

Exemplary embodiments relate generally to decimal adders, and more particularly to a decimal adders performing subtract operations where it is not know which operand is larger.

Previous decimal adders have not included end-a-round carry addition, requiring two separate operations to determine the correct magnitude of a result (e.g., operand A-operand B, and operand B-operand A). Thus, this process often requires an extra cycle to complete the operation.

This disclosure shows a method for designing decimal adders capable of End Around Carry computations to perform decimal addition and subtraction.

BRIEF SUMMARY

An embodiment is a computer program product for implementing binary coded decimal (BCD) arithmetic add/subtract operations on two BCD numbers independent of which BCD number is of a greater magnitude. The computer program product includes a tangible storage medium readable by a processing circuit and storing instructions for execution by the processing circuit for performing a method. The method includes, responsive to the BCD arithmetic add/subtract operation being a subtract operation, performing a BCD arithmetic subtraction operation on a first BCD number and a second BCD number, the first BCD number having a first magnitude and the second BCD number having a second magnitude. The first magnitude is greater than, equal to, or less than the second magnitude. The performing includes: in parallel to a carry generation, partial sums or partial differences of the first and second BCD numbers are computer such that a final result in signed magnitude form is selectable from the partial sums or differences based on carry information without any post processing steps.

An embodiment also includes a system for implementing binary coded decimal (BCD) arithmetic add/subtract operations on two BCD numbers independent of which BCD number is of a greater magnitude. The system includes an arithmetic logic unit. The system also includes logic configured for execution on the arithmetic logic unit. The logic implements a method. The method includes, responsive to the BCD arithmetic add/subtract operation being a subtract operation, performing a BCD arithmetic subtraction operation on a first BCD number and a second BCD number, the first BCD number having a first magnitude and the second BCD number having a second magnitude. The first magnitude is greater than, equal to, or less than the second magnitude. The performing includes: in parallel to a carry generation, partial sums or partial differences of the first and second BCD numbers are computer such that a final result in signed magnitude form is selectable from the partial sums or differences based on carry information without any post processing steps.

A further embodiment is a computer-implemented method for implementing binary code decimal (BCD) arithmetic add/subtract operations on two BCD numbers independent of which BCD number is of a greater magnitude. The method includes responsive to the BCD arithmetic add/subtract operation being a subtract operation, performing a BCD arithmetic subtraction operation on a first BCD number and a second BCD number, the first BCD number having a first magnitude and the second BCD number having a second magnitude. The first magnitude is greater than, equal to, or less than the second magnitude. The performing includes: in parallel to a carry generation, partial sums or partial differences of the first and second BCD numbers are computer such that a final result in signed magnitude form is selectable from the partial sums or differences based on carry information without any post processing steps.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Exemplary embodiments provide a mechanism for providing a decimal adder with end around carry (also referred to herein as "end-around carry adder" and "adder"). The exemplary end-around carry adder allows effective subtract operations to compute the correct magnitude of a result within a single pass through the adder rather than having to compute A−B and B−A and selecting between the result based on which of the results has a positive sign.

The exemplary adder supports several precisions for decimal fixed-point and decimal floating-point data (DFP) types, like DFP 32-bit, DFP 64-bit, and DFP 128-bit. Likewise, the adder can perform both decimal addition and subtraction.

Figure 1:
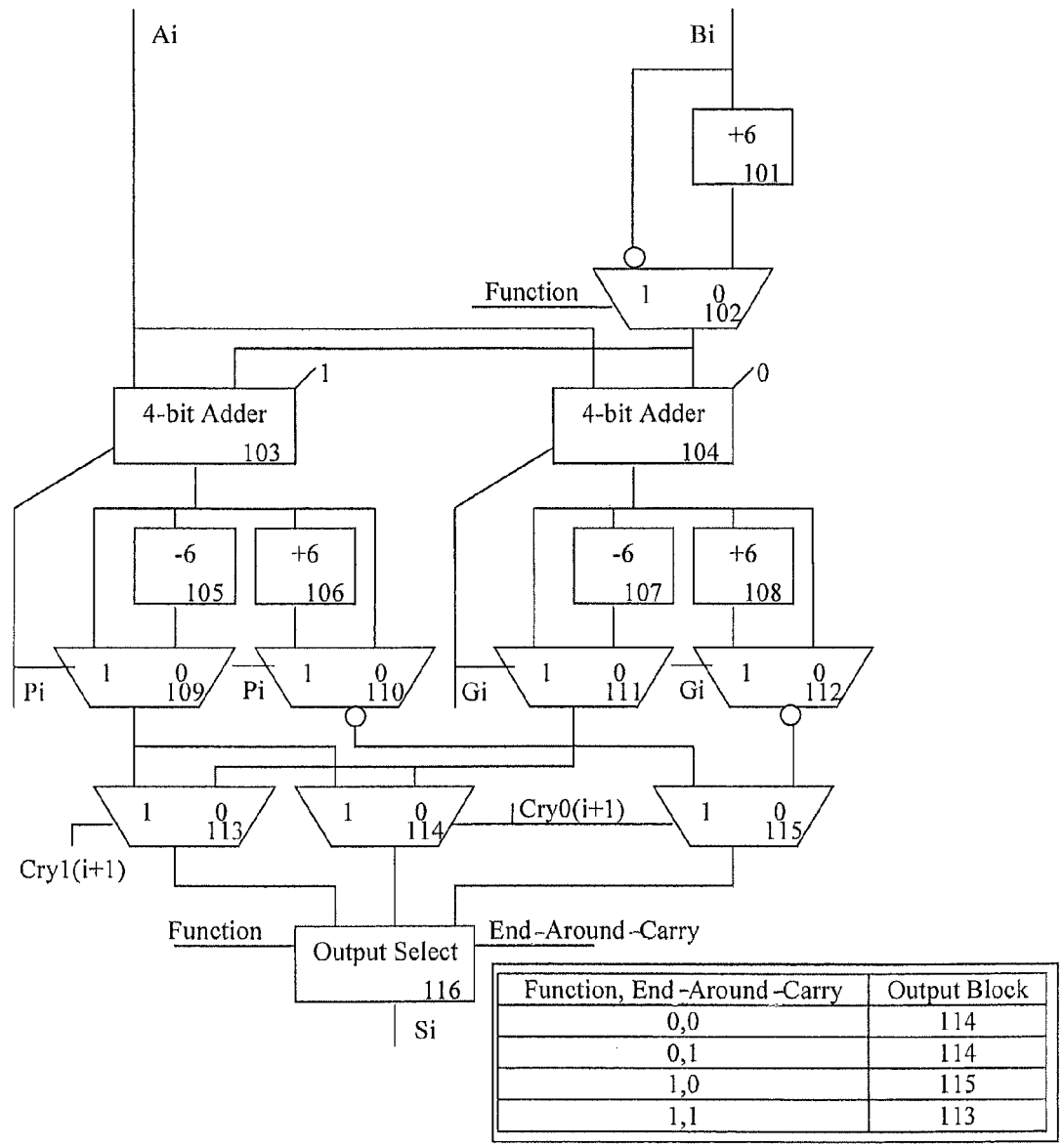
FIG. 1 depicts a detailed 1-digit portion of a system upon which a decimal adder with end around carry may be implemented in an exemplary embodiment.

Turning now to FIG. 1, an exemplary embodiment. As shown in FIG. 1, there are six inputs described as 4-bit Ai, 4-bit Bi, 1-bit Function, 1-bit End-Around-Carry, 1-bit Cry1($i+1$) and 1-bit Cry0($i+1$). 4-bit addend Ai is a BCD digit, 4-bit Addend or Subtrahend Bi is another BCD digit, 1-bit Function denotes a decimal subtract computation is to be performed with a value of 1, and a decimal addition computation is to be performed with a value of 0. One bit input End-Around-Carry is generated from a n-bit binary carry chain Cry0 block 202 discussed later in FIG. 2 whose generate and propagate inputs are the culmination of the n Pi and Gi outputs of n copies of FIG. 1 and such that the input to the carry in of the carry chain is 0.1-bit input Cry1($i+1$) and 1-bit input Cry0($i+1$) are the output of carry chains Cry1 block 201 and Cry0 block 202 illustrated in FIG. 2 from the next least significant digit (the i+1 digit). It is known to those familiar with the art that these two carry chains may actually be implemented in a single carry chain with the addition of a single gate delay but they are treated as separate in this description for ease of illustration and description. There exist three outputs, 1-bit Pi and 1-bit Gi both sent to n-bit binary carry chains producing the carry vectors Cry1 and Cry0 shown in FIG. 2, and the 4-bit result digit Si.

Block 101 adds the value of 6 to 4-bit input Bi and sends the output to multiplexor block 102. Input Bi is also bit-wise inverted, i.e., each of the four bits of Bi is inverted and also sent to block 102. If the function to be computed by the adder is addition, the value of the input Function is 0, and the output of 101 is selected as the output of 102. If the input Function is 1, then the function to be computed is a subtraction, and the inverted Bi input is selected as the output of block 102. The output of block 102 is then sent to the two four-bit adder blocks 103 and 104. The 4-bit input Ai is also sent to block 103 and block 104. The Carry-In into to the 4-bit adder in 103 is equal to 1, whereas the carry-in to the 4-bit adder in 104 is equal to zero. The 4-bit sum output of adder 103 is sent to multiplexor block 109, block 105, block 106, and multiplexor block 110. The output block 105 is connected to multiplexor block 109, and the value of that output is equal to the output of block 103 minus 6. The output of block 106 is connected to inverting multiplexor block 110 and the value of that output is equal to the output of block 103 plus 6. The 1-bit output Pi is an output of FIG. 1 and is sent to the binary carry chains previously mentioned. The Pi is the carry out of the 4-bit Adder block 103. The 4-bit sum output of 104 is sent to multiplexor 111, block 107, block 108, and inverting multiplexor block 112. The output of block 107 is connected to block 111, and the value of that output is equal to the output of block 104 minus 6. The output of block 108 is connected to multiplexor 112, and the value of that output is equal to the output of block 104 plus 6. The 1-bit output Gi is an output of FIG. 1 and is sent to the binary carry chains previously mentioned. The Gi is the carry out of the 4-bit Adder block 104.

The output Pi is also connected to block 109 and block 110. When the value of Pi is 1, block 109 selects as its output the value of block 103, and block 110 selects the bit-wise inversion of block 106 as its output. When the value of Pi is 0, block 109 selects as its output the value from block 105, and block 110 selects as its output the bit-wise inversion of the output of block 103. The output Gi is also connected to block 111 and block 112. When the value of Gi is 1, block 111 selects as its output the value of block 104, and block 112 selects the bit-wise inversion of block 108 as its output. When the value of Gi is 0, block 111 selects as its output the value from block 107, and block 112 selects as its output the bit-wise inversion of block 104. The 4-bit output of block 109 is connected to multiplexor block 113 and block 114. The 4-bit output of block 110 is connected to multiplexor block 115. The 4-bit output of block 111 is connected to multiplexor block 113 and block 114. The 4-bit output of block 112 is connected to multiplexor block 115. The input Cry1($i$+1) is connected to multiplexor block 113 such that when the value of Cry1($i$+1) is 1, block 113 selects as its output the value of block 109, and when Cry1($i$+1) is 0 block 113 selects as its output the value of block 111. Cry0($i$+1) is connected to block 114 and block 115 such that when the value of Cry0($i$+1) has a 1, block 114 selects as its output the value of block 109, and block 115 selects as its output the value of block 110. When Cry0($i$+1) has a value of 0, block 114 selects as its output the value of block 111, and block 115 selects as its output the value of block 112. The 4-bit output of block 113, block 114 and block 115 are connected to Output Select block 116. Output Select block 116 also receives 1-bit input function and 1-bit input End-Around-Carry. The 4-bit output of block 116 is the output Si of FIG. 1 and contains the output of the adder function. The value of block 116 is determined by inputs Function and End-Around-Carry such that when the function has a value of 0, the block 116 selects as its output the value of block 114. When the function has a value of 1 and End-Around-Carry has a value of 0, block 116 selects as its output the value of block 115. When the function has a value of 1 and End-Around-Carry has a value of 1, block 116 selects as its output the value of block 113.

FIG. 1 illustrates 1 digit of an n-digit adder where Ai and Bi refer to the ith digit of the adder such that A0 and B0 are the inputs to the most significant digit of the adder, and An−1 and Bn−1 are least significant digits of the adder. Therefore, an n-digit adder would contain n copies of FIG. 1 in addition to an n-bit binary carry chain. The output of the adder and thus the output of each digit of the adder shown in FIG. 1 is either a summation when the adder is performing an addition operation (i.e., the function has a value of 0) or the absolute value of the difference of the inputs when the adder is performing a subtract operation (i.e., the function has a value of 1). The sign of the difference is processed in the adder, and the results in this format are often referred to as sign-magnitude.

Figure 2:
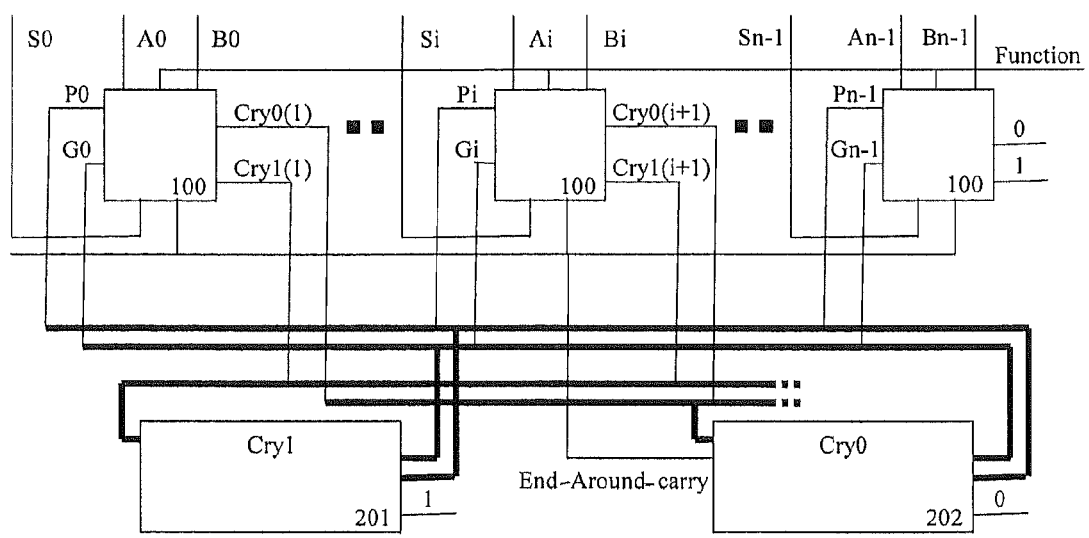
FIG. 2 shows an n-digit adder connected to carry chains necessary to perform the end around carry addition and subtraction operations.

FIG. 2 shows the structure of the adder composed as n copies of the 4-bit digit adder described in FIG. 1 connected to n-bit binary adder carry chains Cry0 block 202 and Cry1 block 201. There are two outputs, the first output being S(0 to n−1) that is composed of n 4-bit decimal digits that comprise the result of the decimal computation, either addition or subtraction based on 1-bit input Function, such that subtraction operations have a result that are of sign magnitude BCD format, the sign processing not shown in the figure. It is known to those familiar with the art that the sign is a function of the signs of the n-digit input operands A and B (signs of which are not shown) and the 1-bit output End-Around-Carry. Carry chain block 201 is a binary carry chain with a carry in set to 1. It receives n P and G bits from the Pi and Gi outputs of the n multiples of block 100 and it drives the n Cry1($i$) inputs to the n multiples of block 100. Carry chain block 202 is a binary carry chain with a carry in set to 0. It receives n P and G bits from the Pi and Gi outputs of the n multiples of block 100 and it drives the Cry0($i$) inputs to the n multiples of block 100. Block 202 also generates the End-Around-Carry signal.

In an exemplary embodiment, the adder provides the ability to compute the correct magnitude of the difference between the two operands A and B, both BCD vectors, regardless of whether A is larger then B, B is larger then A, or A and B are equal. Prior art shows methods of determining how to find the difference between A and B when A is larger then B, however the 9's compliment of the desired result is often the output of prior designs when B is larger than A. Such designs often require a separate operation where the two operands are swapped to correctly evaluate the difference. Other designs may have a post processing step where a 9's compliment result is converted back into the correct difference magnitude. The exemplary embodiment described herein shows how the use of this end around carry addition method for decimal adders can be employed to correctly compute the magnitude of the difference in one pass through the adder without additional processing steps necessary in existing techniques.

Figure 3:
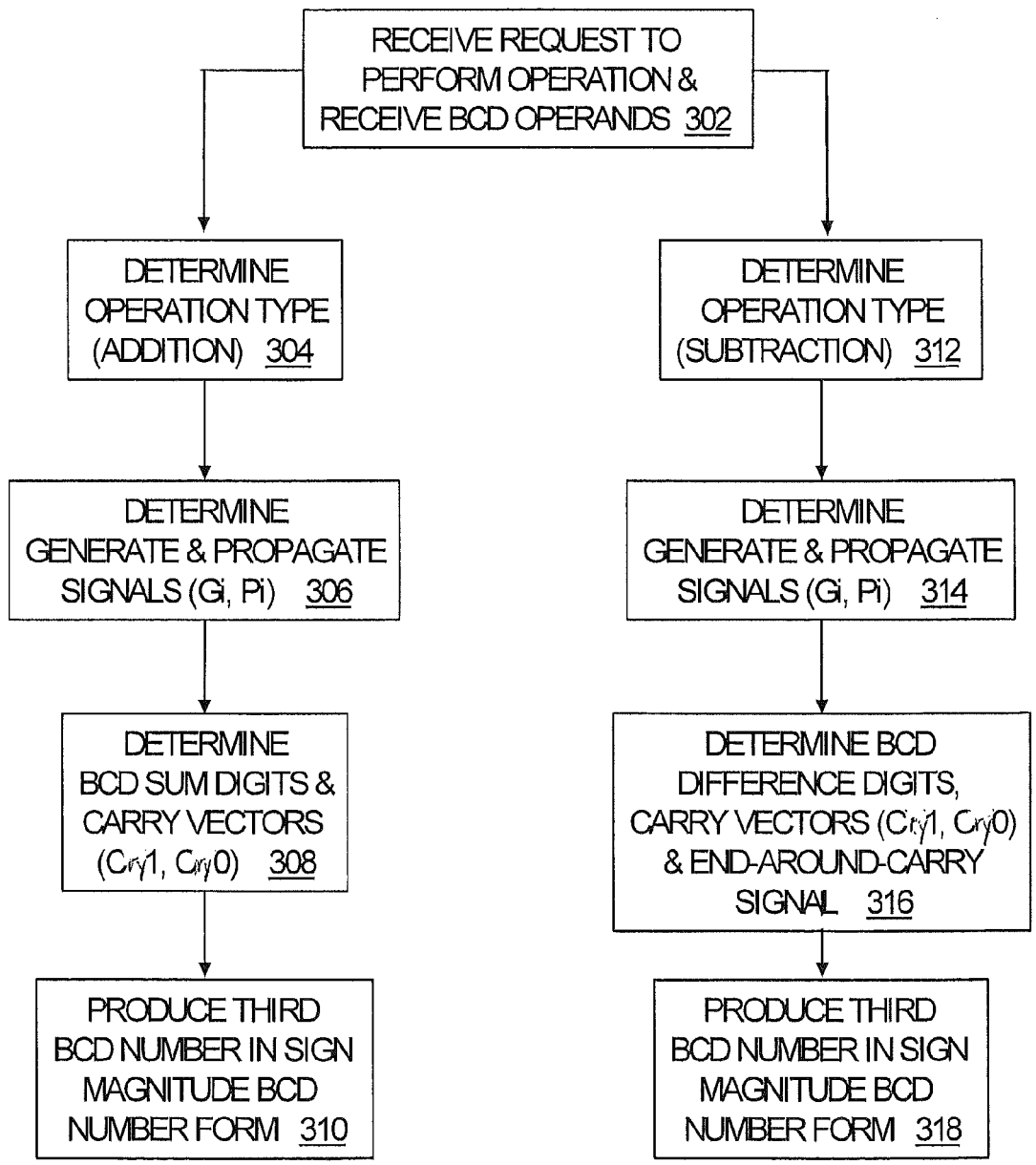
FIG. 3 is a flow diagram describing a process for implementing decimal adder with end around carry in an exemplary embodiment.
Figure 4:
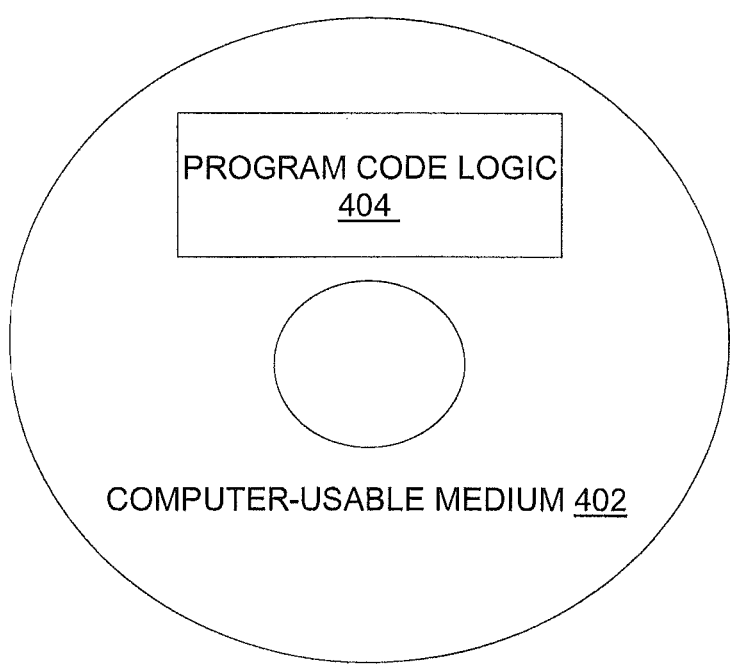
FIG. 4 is a computer program product in an exemplary embodiment.

Turning now to FIG. 3, an exemplary process for implementing decimal adder with end around carry will now be described in an exemplary embodiment. The processes described in FIG. 3 are utilized for both add/subtract operations and the corresponding binary coded decimal (BCD) arithmetic add/subtract operations are performed on two BCD numbers independent of which BCD number is of a greater magnitude.

At block 302, a request to perform a BCD arithmetic operation is received along with two BCD numbers as operands.

The exemplary processes determine what type of operation (i.e., addition/subtraction) is requested in the operation request.

Blocks 304-310 are performed if the operation is determined to be an addition operation, and blocks 312-318 are performed if the operation is determined to be a subtraction operation. In either case, the first BCD number A has a first magnitude and the second BCD number B has a second magnitude, and the first magnitude is greater than, equal to, or less than the second magnitude.

At block 304, it is determined that the operation is an addition operation, and a BCD arithmetic add operation is performed on the first BCD number and the second BCD number as described in blocks 306-308.

In block 306, for each BCD digit of the first BCD number A and the second BCD number B, a digit generate signal Gi and a digit propagate signal Pi are determined for the addition operation.

In block 308, for each BCD digit of the first BCD number A and the second BCD number B, two resulting BCD sum digits are determined, one corresponding to a digit carry in of 1 and the other corresponding to a digit carry of 0. In parallel, the generate signals Gi and the propagate signals Pi from block 306 are evaluated generating two n-bit carry vectors CRY1 and CRY0.

In block 310, the third BCD number is produced in a sign magnitude BCD number format. Each digit of the third BCD number is selected from the two corresponding BCD sum digits from block 308 based on the corresponding bit of the carry vectors CRY1 and CRY0 from block 308.

Blocks 312-318 illustrate the exemplary process when the operation is a subtract operation, as will now be described. In block 312, it is determined that the operation is a subtract operation, and a BCD arithmetic subtract operation is performed on the first BCD number A and the second BCD number B as described in blocks 314-318.

In block 314, for each BCD digit of the first BCD number A and the second BCD number B, a digit generate signal Gi and a digit propagate signal Pi are determined for the subtraction operation.

In block 316, for each BCD digit of the first BCD number A and the second BCD number B, two resulting BCD digits of the difference are determined, one corresponding to a digit carry in of 1 and the other corresponding to a digit carry of 0. In parallel, the generate signals Gi and the propagate signals Pi from block 314 are evaluated generating two n-bit carry vectors CRY1 and CRY0 and the end-around-carry signal.

In block 318, the third BCD number is produced in a sign magnitude BCD number format. Each digit of the third BCD number is selected from the two corresponding BCD difference digits from block 316 based on the corresponding bit of the carry vectors CRY1 and CRY0 from block 316 and based on the end-around-carry signal from block 316.

Figure 5:
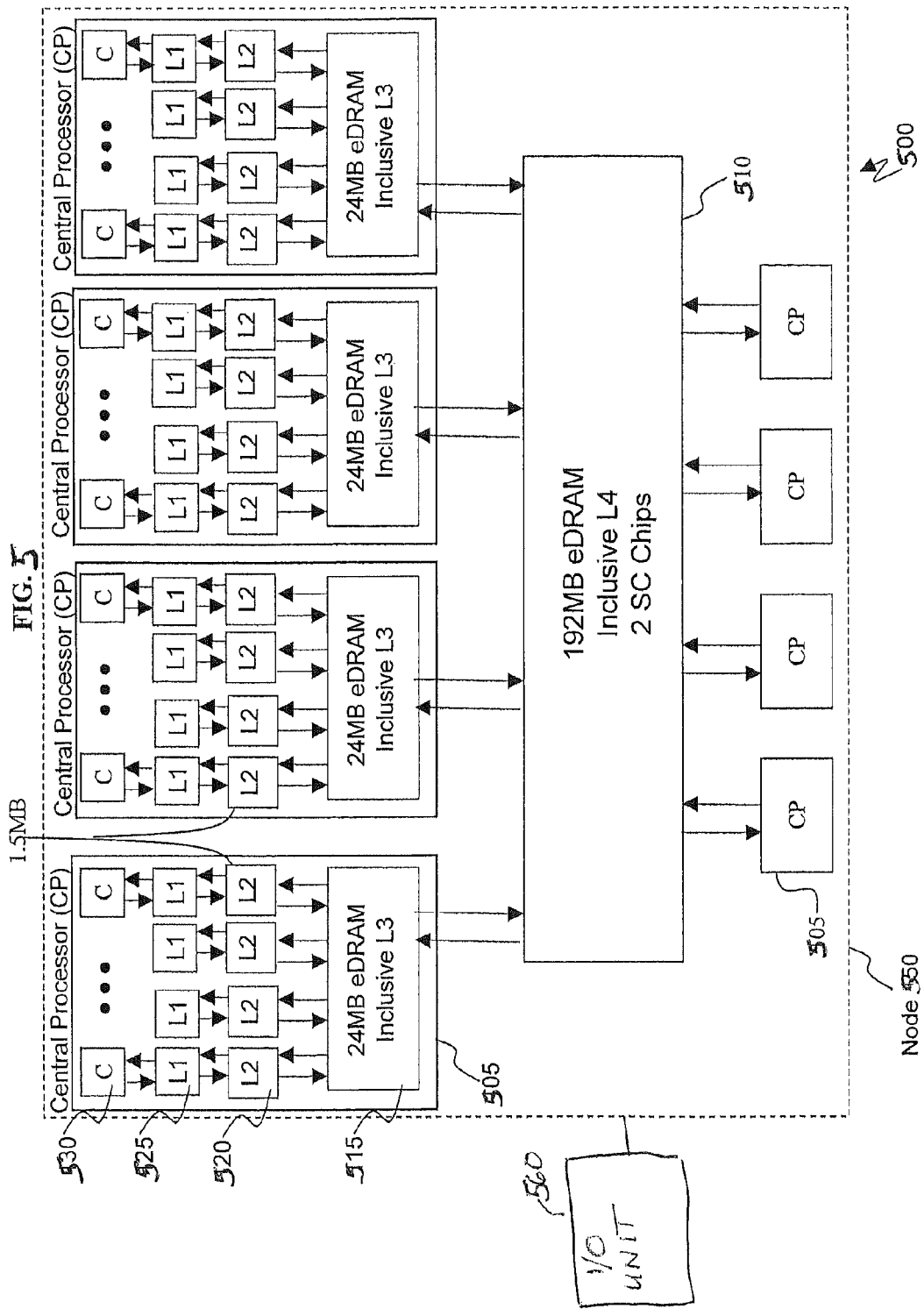
FIG. 5 depicts a system in an exemplary embodiment.

The exemplary embodiments described herein may be implemented by a system as shown, e.g., in FIG. 5. The system 500 of FIG. 5 illustrates a plurality of central processors (CP) 505 (also referred to as central processing units) operatively connected via busses to one or more L4 caches 510. Although not shown in FIG. 5, each of the central processors (CP) 505 includes one or more cores 530 which perform the reading and executing of instructions. On each central processor (CP) 505, the multiple cores 530 are operatively connected via busses to L1, L2, and L3 caches 525, 520, and 515. The L1 caches 525 are physically closest to the cores 530, followed by the L2 caches 520, and then the L3 caches 515. It is understood that the designation of caches could be reversed.

Also shown in the system 500 is an L4 cache 510. The L4 cache 510 is operatively coupled to the CPs 505 and provides a shared memory space for each of the CPs 505. Although the L3 and L4 caches 515 and 510 are illustrated in FIG. 5 as embedded dynamic random access memory (DRAM), which is referred to as eDRAM, it will be understood by a skilled artisan that any other types of suitable memory may be utilized in realizing the exemplary embodiments. The central processors 505 operatively connected to one or more L4 caches 510 collectively form a node 550. In a computing system, multiple such nodes 550 may be operatively connected to one another for communicating, such as broadcasts, snooping, cache intervention, and responses.

The system 500 is communicatively coupled to an input/output (I/O) unit 560. The I/O unit 560 may include, e.g., an I/O hub, adapters, and interface elements for performing various operations in connection with the central processors 505.

The exemplary decimal adder may be implemented via one of the central processors 505 or by a separate chip, e.g., an arithmetic logic unit (ALU).

Technical effects include providing a decimal adder with end-around-carry. The exemplary end-around-carry adder allows effective subtract operations to compute the correct magnitude of a result within a single pass through the adder rather than having to compute A−B and B−A and selecting between the result based on which of the results has a positive sign.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product 400 embodied in one or more computer readable medium(s) 402 having computer readable program code embodied thereon 404.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for implementing a binary code decimal (BCD) arithmetic add/subtract operation on two BCD numbers independent of which BCD number is of a greater magnitude, the computer program product comprising a tangible storage medium readable by a processing circuit and storing instructions for execution by the processing circuit for performing a method, the method comprising:
   performing a BCD arithmetic add/subtract operation on a first BCD number A and a second BCD number B, wherein the first BCD number A has a first magnitude and the second BCD number B has a second magnitude, wherein the first magnitude is one of greater than, equal to, and less than the second magnitude, the performing comprising:
   generating carry information based on the first and second BCD numbers;
   in parallel to the generation of the carry information, computing a sum and two differences of the first and second BCD numbers; and
   selecting a final result in signed magnitude form from the sum and two differences based on the carry information and a control signal indicating one of an add operation and a subtract operation without any post processing steps.

2. The computer program product of claim 1, wherein the carry information comprises carry vectors and an End Around Carry signal.

3. The computer program product of claim 2, further comprising generating the End Around Carry signal for a subtract operation based on the magnitude of BCD number A being greater than the magnitude of BCD number B.

4. The computer program product of claim 3, wherein computing one of the partial differences comprises:
   adding 6 to and inverting an output of a 4-bit adder; and
   based on the control function indicating an subtract operation, selecting said one of the partial differences as the final result based on the carry vectors comprising no carry out from a carry chain that has a carry in of 0.

5. The computer program product of claim 2, wherein computing the sum and two differences of the first and second BCD numbers comprises:
   computing values of A+B, A−B, and B−A; and
   wherein selecting the final result in signed magnitude form from the sum and two differences based on the carry information and the control signal indicating one of an add operation and a subtract operation without any post processing steps comprises:
      based on the control function indicating an add operation, selecting the computed value of A+B as the final result;
      based on the control function indicating a subtract operation and further based on the End Around Carry signal, selecting the computed value of A−B as the final result; and
      based on the control function indicating a subtract operation and further based on no End Around Carry signal, selecting the computed value of B−A as the final result.

6. The computer program product of claim 1, wherein the BCD subtract operation is in a decimal floating point (DFP) format.

7. A system for implementing a binary code decimal (BCD) arithmetic add/subtract operation on two BCD numbers independent of which BCD number is of a greater magnitude, the system comprising:
   an arithmetic logic to implement a method comprising:
   performing a BCD arithmetic add/subtract operation on a first BCD number A and a second BCD number B, wherein the first BCD number A has a first magnitude and the second BCD number B has a second magnitude, wherein the first magnitude is one of greater than, equal to, and less than the second magnitude, the performing comprising:
      generating carry information based on the first and second BCD numbers;
      in parallel to the generation of the carry information, computing a sum and two differences of the first and second BCD numbers; and
      selecting a final result in signed magnitude form from the sum and two differences based on the carry information and a control signal indicating one of an add operation and a subtract operation without any post processing steps.

8. The system of claim 7, wherein the carry information comprises carry vectors and an End Around Carry signal.

9. The system of claim 8, further comprising generating the End Around Carry signal for a subtract operation based on the magnitude of BCD number A being greater than the magnitude of BCD number B.

10. The system of claim 9, wherein computing one of the partial differences comprises:
    adding 6 to and inverting an output of a 4-bit adder; and
    based on the control function indicating an subtract operation, selecting said one of the partial differences as the final result based on the carry vectors comprising no carry out from a carry chain that has a carry in of 0.

11. The system of claim 8, wherein computing the sum and two differences of the first and second BCD numbers comprises:
    computing values of A+B, A−B, and B−A; and
    wherein selecting the final result in signed magnitude form from the sum and two differences based on the carry information and the control signal indicating one of an add operation and a subtract operation without any post processing steps comprises:
       based on the control function indicating an add operation, selecting the computed value of A+B as the final result;
       based on the control function indicating a subtract operation and further based on the End Around Carry signal, selecting the computed value of A−B as the final result; and
       based on the control function indicating a subtract operation and further based on no End Around Carry signal, selecting the computed value of B−A as the final result.

12. The system of claim 7, wherein the BCD subtract operation is in a decimal floating point (DFP) format.

13. A computer-implemented method for implementing a binary code decimal (BCD) arithmetic add/subtract operation on two BCD numbers independent of which BCD number is of a greater magnitude, the method comprising:
    performing, by an arithmetic logic of a computer, a BCD arithmetic add/subtract operation on a first BCD number A and a second BCD number B, wherein the first BCD number A has a first magnitude and the second BCD number B has a second magnitude, wherein the first magnitude is one of greater than, equal to, and less than the second magnitude, the performing comprising:
       generating carry information based on the first and second BCD numbers;
       in parallel to the generation of the carry information, computing a sum and two differences of the first and second BCD numbers; and
       selecting a final result in signed magnitude form from sum and two differences based on the carry information and a control signal indicating one of an add operation and a subtract operation without any post processing steps.

14. The computer-implemented method of claim 13, wherein the carry information comprises carry vectors and an End Around Carry signal.

15. The computer-implemented method of claim 14, further comprising generating the End Around Carry signal for a subtract operation based on the magnitude of BCD number A being greater than the magnitude of BCD number B.

16. The computer-implemented method of claim 15, wherein computing one of the partial differences comprises:
    adding 6 to and inverting an output of a 4-bit adder; and
    based on the control function indicating an subtract operation, selecting said one of the partial differences as the final result based on the carry vectors comprising no carry out from a carry chain that has a carry in of 0.

17. The computer-implemented method of claim 14, wherein computing the sum and two differences of the first and second BCD numbers comprises:
    computing values of A+B, A−B, and B−A; and
    wherein selecting the final result in signed magnitude form from the sum and two differences based on the carry information and the control signal indicating one of an add operation and a subtract operation without any post processing steps comprises:

based on the control function indicating an add operation, selecting the computed value of A+B as the final result;

based on the control function indicating a subtract operation and further based on the End Around Carry signal, selecting the computed value of A-B as the final result; and based on the control function indicating a subtract operation and further based on no End Around Carry signal, selecting the computed value of B−A as the final result.

18. The computer-implemented method of claim 13, wherein the BCD subtract operation is in a decimal floating point (DFP) format.

\* \* \* \* \*